United States Patent [19]

Nakano et al.

[11] Patent Number: 5,559,984
[45] Date of Patent: Sep. 24, 1996

[54] DISTRIBUTED FILE SYSTEM PERMITTING EACH USER TO ENHANCE CACHE HIT RATIO IN FILE ACCESS MODE

[75] Inventors: Hirohiko Nakano; Seiichi Domyo; Takaki Kuroda; Naofumi Shouji, all of Yokohama; Atsushi Kobayashi, Machida, all of Japan

[73] Assignee: Hitachi, Ltd., Tokyo, Japan

[21] Appl. No.: 313,844

[22] Filed: Sep. 28, 1994

[30] Foreign Application Priority Data

Sep. 28, 1993 [JP] Japan .................................. 5-241534

[51] Int. Cl.[6] .......................... G06F 12/02; G06F 12/12; G06F 15/177
[52] U.S. Cl. ...................... 395/448; 395/600; 395/486; 395/200.01; 395/200.12; 364/DIG. 1; 364/242.94; 364/243.41
[58] Field of Search ........................ 395/200.01, 200.12, 395/448, 486, 600

[56] References Cited

U.S. PATENT DOCUMENTS

| | | | |
|---|---|---|---|
| 4,897,781 | 1/1990 | Chang et al. | 395/600 |
| 5,305,440 | 4/1994 | Morgan et al. | 395/200.03 |
| 5,442,771 | 8/1995 | Filepp et al. | 395/650 |
| 5,452,447 | 9/1995 | Nelson et al. | 395/650 |
| 5,491,820 | 2/1996 | Belove et al. | 395/600 |

OTHER PUBLICATIONS

James J. Kistler, "Increasing File System Availability through Second–Class Replication," Management of Replicated Data, 1990 Workshop, IEEE, pp. 65–69.

Carl D. Tait et al., "Detection and Exploitation of File Working Sets," 1991 Int'l Con'f on Distributed Computing Systems, IEEE, pp. 2–9.

Donna Mecozzi et al., "Design for a Transparent, Distributed File System," 1991 11th IEEE Symposium on Mass Storage Systems, IEEE, pp. 77–84.

Carl Hauser, "A Plea for Interfaces that Support Caching," Workstation Operating Systems, 1992, IEEE, pp. 137–139.

Byung Gi Hong et al., "Ownership–Based Cache Constistency Model in a Distributed File System," TENCON '93— 1993 IEEE Region 10 Conf. on Computer, Communication . . . , 1993, IEEE, pp. 161–164.

Swee B. Lim, "The Object–Oriented Advantage in Prototyping a Remote File System", 1992 Int'l Workshop on Object Orientation in Operating Systems, IEEE, pp. 190–199.

Michael N. Nelson et al., "Caching in an Object Oriented System," 1993 Int'l Conf. on Object Orientation in Operating Systems, IEEE, pp. 95–106.

ACM Transactions on Computer Systems, vol. 10, No. 1, Feb., 1992, pp. 3–25, J. J. Kistler, et al., "Disconnected Operation in the Coda File Sytesm".

Primary Examiner—Paul V. Kulik
Attorney, Agent, or Firm—Antonelli, Terry, Stout & Kraus

[57] ABSTRACT

A distributed file system in which the cache hit ratio of a client is enhanced to speed up a file access for each of users logging into the client. A file server includes an access frequency database in which the names of users are listed in association with the names of files that are frequently accessed by the individual users. Each client includes a log-in user table for entering the name of a user who is logging in, and a cache priority control module. The cache priority control module sets priority levels for the copies of the files stored in a cache area, on the basis of the contents of the access frequency database and the log-in user table. The set priority levels function as criteria when any of the file copies is to be expelled from the cache area. Owing to this construction, the copies of the files of high usage frequencies are preferentially kept in the cache area of the client for each user logging into this client, whereby the cache hit ratio can be enhanced to speed up the file access.

19 Claims, 17 Drawing Sheets

F I G. 12
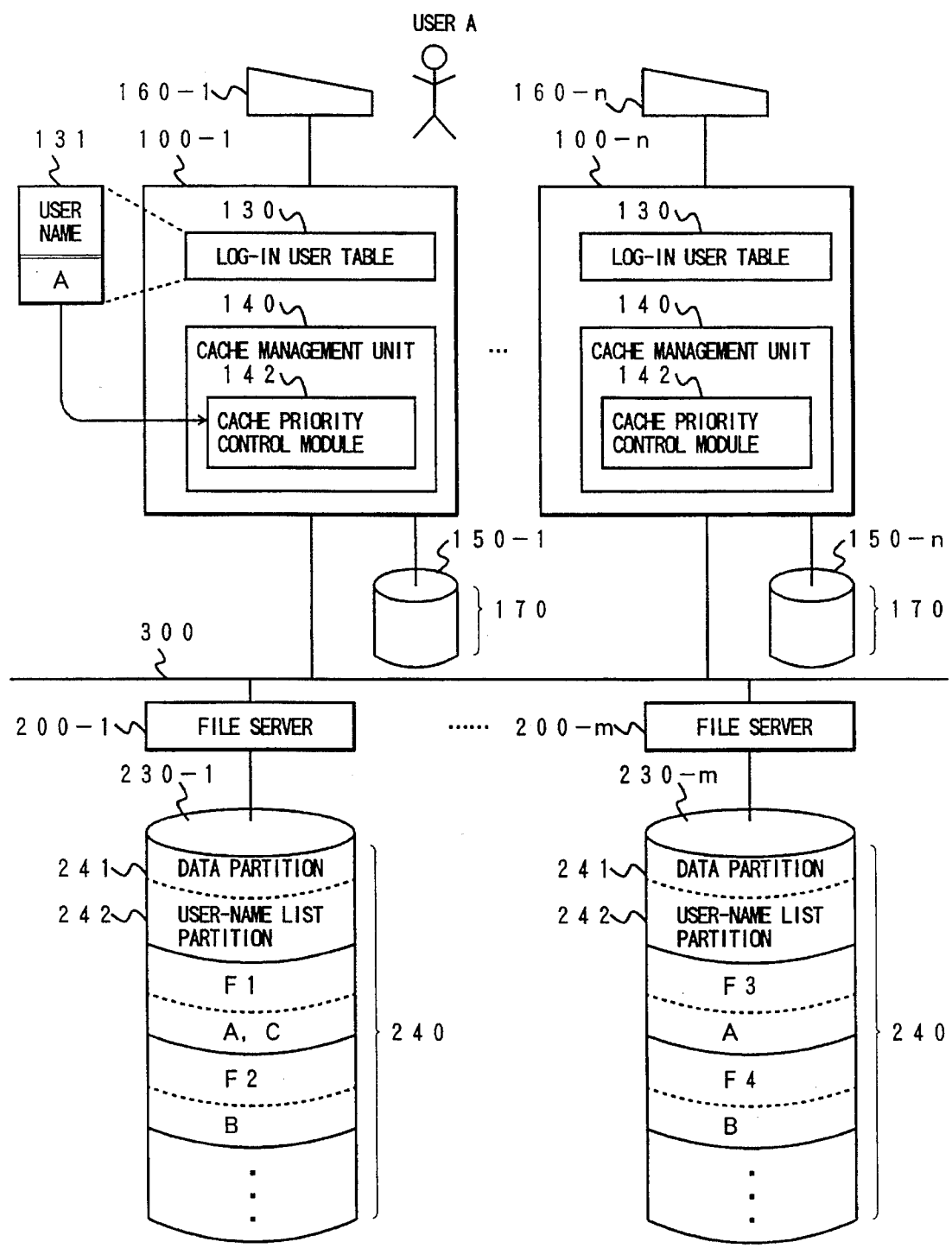

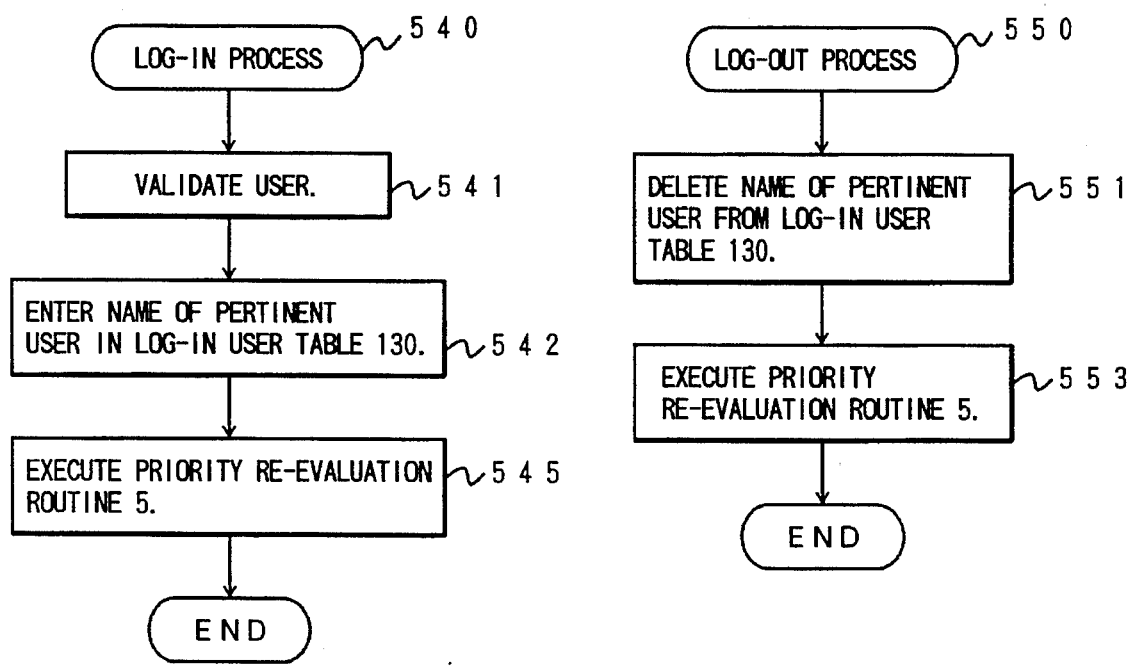

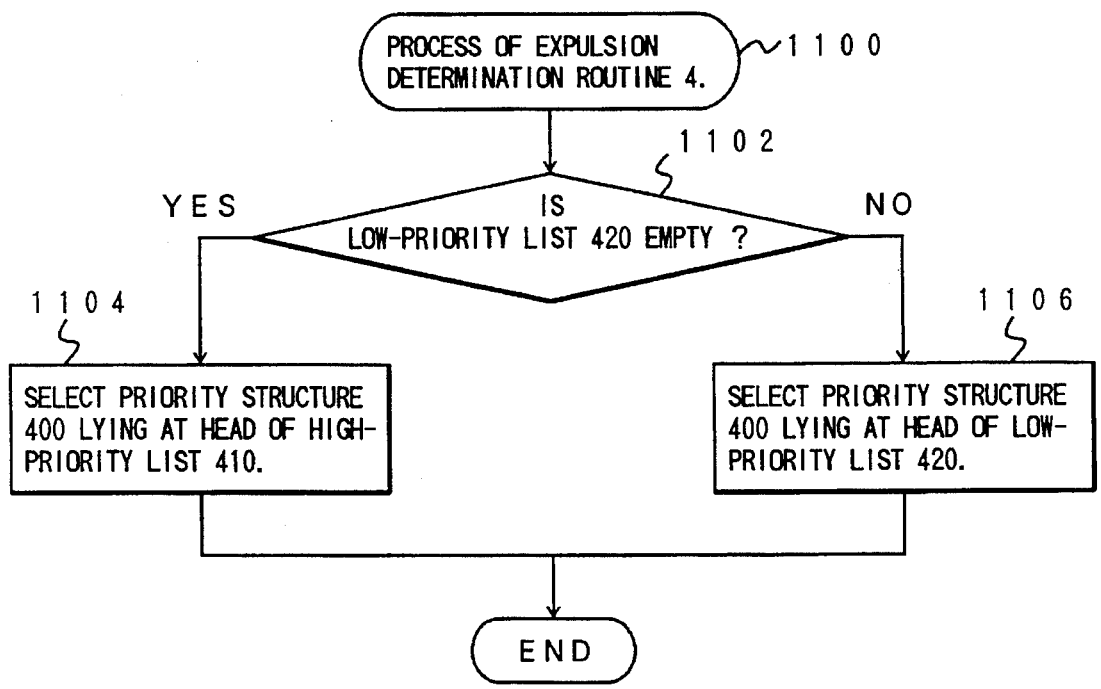

DISTRIBUTED FILE SYSTEM PERMITTING EACH USER TO ENHANCE CACHE HIT RATIO IN FILE ACCESS MODE

BACKGROUND OF THE INVENTION

1. Field of the Invention

The present invention relates to a distributed file system in which a file server for administering files, and clients for accessing the files, are connected through a network. More particularly, it relates to a distributed file system in which files having high usage frequencies are cached in clients.

2. Description of the Related Art

In many distributed file systems, file accesses are speeded up in such a way that files administered by a file server are cached in clients. More specifically, the copy of a particular one of the files administered by the file server is held on the client side. Thus, in a case where an access request for the particular file occurs next time, the client can handle the access request by itself without accessing the file server. The area of the client for administering such cached files is called a "cache area". The cache area is ordinarily reserved within the main storage or disk storage of the client.

Usually, the cache area has a limited storage capacity and cannot hold all the files to-be-accessed therein. The hit ratio of caching greatly affects file access performance. It is therefore very important to effectively utilize the limited cache area, and to achieve a high cache hit ratio.

In order to cache any file, a space for administering the copy of the file must be reserved within the cache area. In a case where a large number of files have already been cached, and where sufficient space cannot be reserved, any of the files stored in the cache area need to be expelled therefrom.

Usually, the client assigns priority levels to the respective cached files, whereupon it selects the files to be expelled from the cache area, in the order of ascending priority levels. Desirable for enhancing the hit ratio of caching is a cache control in which the files of higher frequencies in use are set at higher priority levels and are kept or left in the cache area at higher probabilities.

According to a method wherein actual file accesses are observed so as to assign higher priority levels to recently accessed files, cache control reflecting the frequencies of use of files can be realized to some extent. However, in a case where the frequencies of use of files are known beforehand, it is effective to perform a cache control in which a particular one of the files to be frequently accessed is set at a high priority level so as to prevent as far as possible that particular file from being expelled from the cache area. By way of example, a program developer accesses a source file frequently. In a client machine which the program developer uses, the high priority level is set for the source file beforehand, whereby the hit ratio of caching can be enhanced to speed up the file access.

A prior-art technique close to the present invention is a "Coda" distributed file system. In the "Coda" distributed file system, the priority levels of files are set for every client. That particular one of the files which is frequently accessed is set at a high priority level and is kept in the cache area of the client having a high probability of use, whereby the hit ratio of caching can be enhanced. The "Coda" distributed file system is stated in J. Kistler and M. Satyanarayanan: "Disconnected Operation in the Coda File System", ACM Transactions on Computer Systems, Vol. 10, No. 1, pp. 3–25 (1992).

A user who utilizes the distributed file system logs into one of the clients, and accesses any of the files administered by the file server. The files to be accessed differ between individual users. Therefore, the files which are frequently accessed by a certain client differ greatly depending upon the users who log into the client.

Accordingly, with the aforementioned prior-art technique which determines the priority levels of the files for every client, it is difficult to alter the priority levels of the files in accordance with the user who is logged in. Consequently, there is the possibility that a file which is frequently accessed by the user may fail to be set at a high priority level and may be expelled from the cache area. This leads to lowering of the hit ratio of caching.

SUMMARY OF THE INVENTION

An object of the present invention is to provide a distributed file system which can enhance the hit ratio of caching and speed up a file access for every user.

In order to accomplish the object, according to the present invention, in a distributed file system wherein a file server administers a plurality of files, and clients for accessing the files administered by the file server are connected through a network; and each of the clients has a cache memory for administering copies of the files, and a priority table for storing therein priority levels which function as criteria for judging if the copies of the files placed in the cache memory of the pertinent client through accesses from the pertinent client to the file server are to be kept in the cache memory, when the copy of any of the files is to be expelled; a method of controlling a cache memory for files comprises the step of prestoring names of users and names of those ones of the files which are frequently accessed by the users, as an access frequency database in the file server; the user names and the file names being associated for the respective users who log into the corresponding pertinent clients, in the access frequency database; the step of recognizing the user name of a certain one of the users, in the pertinent client when the certain user is logging in; the step of checking if a particular one of the files having a certain one of the file names is a file which is frequently accessed by the recognized user, in the pertinent client, and on the basis of the contents of the access frequency database when the recognized user has loaded the copy of the particular file from the file server into the cache memory; the step of setting the priority level of the particular file in accordance with the checked result so that the priority levels of the files of high access frequencies may become high, and then storing the set priority level in the priority table; and the step of determining the file whose priority level is low for the user operating the pertinent client currently, as the file to-be-expelled on the basis of the contents of the priority table when the copy of any of the files is to be expelled from the cache memory of the pertinent client.

Besides, according to the present invention, in a distributed file system wherein at least one file server administering a plurality of files, and clients for accessing the files administered by the file server are connected through a network; a distributed file system comprises the fact that the file server includes an access frequency database in which names of users to log into the corresponding pertinent clients and names of the files to be frequently accessed by the respective users are prestored associatively; and that each of the clients includes a log-in user table for entering therein the name of the user who is logging in; a cache memory for administering copies of the files stored in the file server; and cache management means for setting priority levels for the respective copies of the files stored in the cache memory, and for performing a control in which the copy of low priority level is expelled from the cache memory when sufficient free space cannot be reserved in the cache memory in the case of loading a copy of another of the files of the file server into the cache memory; the cache management means setting the priority levels for the respective copies of the files stored in the cache memory, on the basis of the log-in user table and the access frequency database.

In the access frequency database, the names of users and the names of files to be frequently accessed by the corresponding users are entered associatively. The name of any file to be frequently accessed by any user, or the name of any user to frequently access any file can be respectively searched for by referring to the access frequency database with the name of the user or the name of the file as a key.. Moreover, since the access frequency database exists in the file server, it can be referred to by all the clients.

In the log-in user table, the name of the user who is logging into the pertinent client is entered. The cache management means specifies the file which is frequently accessed by the logged-in user, by referring to the log-in user table and the access frequency database. It sets a high priority level for the specified file. Thus, the copies of such files can be administered in the cache memory of the pertinent client when there is a high probability of access.

In this manner, the present invention can provide the distributed file system in which, even in the identical client, the hit ratio of the cache memory is enhanced to speed up the file access in correspondence with each user logged into the client.

BRIEF DESCRIPTION OF THE DRAWINGS

FIG. 12 is a block diagram showing the system architecture of the fourth embodiment;

FIG. 14 is an explanatory diagram showing the organization of a local frequency database (144) which is included in the fourth embodiment;

FIG. 15 is a flowchart showing a log-in process (540) and a log-out process (550) which are executed in the fourth embodiment;

FIG. 17 is an explanatory diagram showing the organization of a local frequency database (144) which is included in the first embodiment;

FIG. 18 is a flow chart showing the process (1100) of an expulsion determination routine (4) which is included in the first embodiment.

PREFERRED EMBODIMENTS OF THE INVENTION

Now, the preferred embodiments of the present invention will be described in detail with reference to the accompanying drawings.

Figure 1:
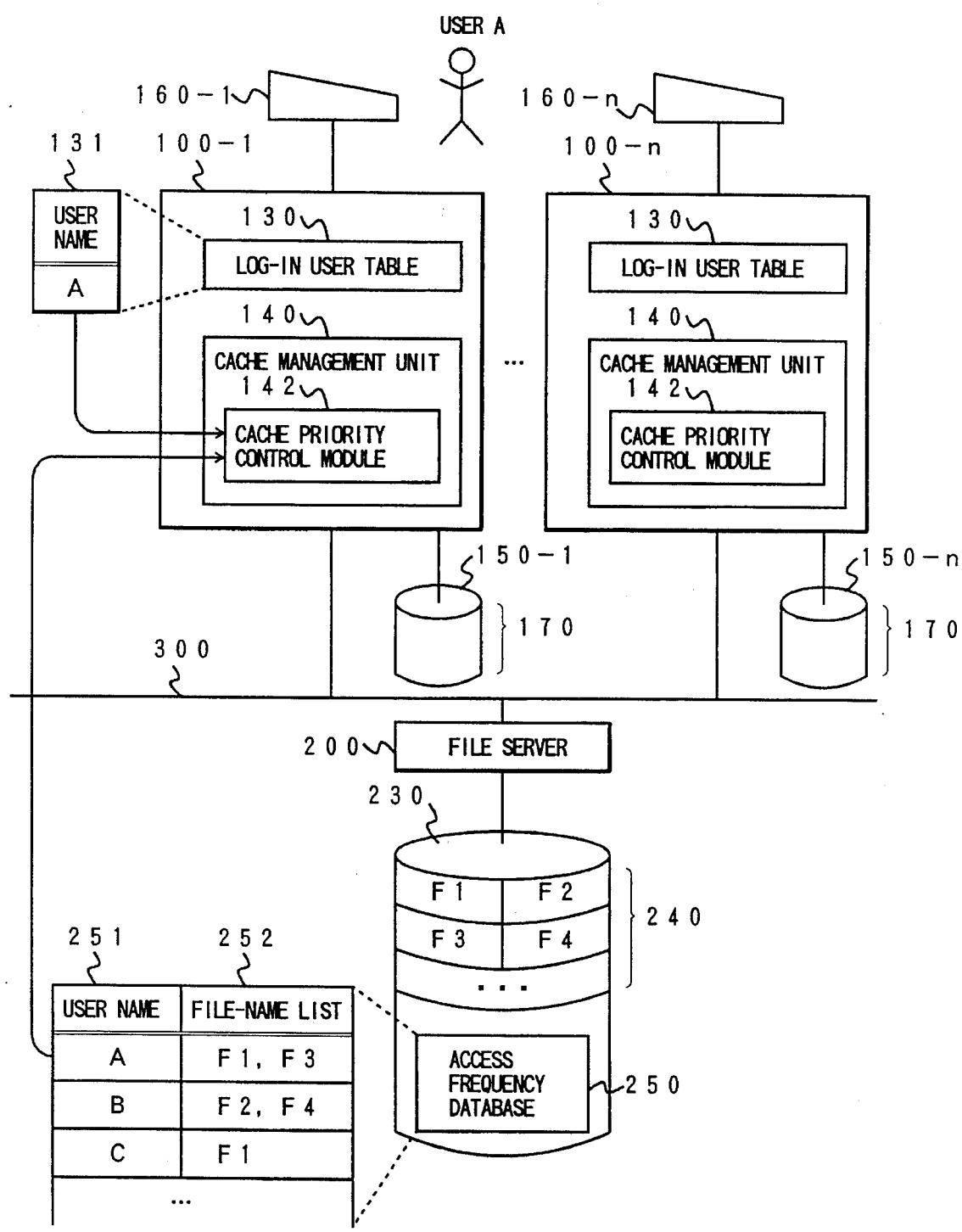
FIG. 1 is a block diagram showing the system architecture of the first embodiment of a distributed file system according to the present invention.

FIG. 1 illustrates the system architecture of a distributed file system in the first embodiment of the present invention. In this system, a file server 200 and n clients 100 (100-1 through 100-n) are connected to a network 300. A local area network (LAN) is adopted as the network 300. A high-performance workstation is adopted as the file server 200, while an inexpensive workstation or a personal computer is adopted as each client 100. The n clients 100 are respectively installed in terminal rooms which are distant from the file server 200. The user of the distributed file system logs into any of the clients 100 so as to access a file.

The file server 200 is furnished with a disk storage of large capacity 230. A large number of files 240 including files F1, F2, F3 and F4, and an access frequency database 250 are administered by the file server 200, and they are stored in the disk storage 230.

The access frequency database 250 is configured of a user name field 251 and a file-name list field 252. In the access frequency database 250, the names of the files to be frequently accessed by the users utilizing the distributed file system are respectively entered in association with the names of the users. In the illustrated example, the files F1 and F3, the files F2 and F4 and the file F1 are respectively entered for the user A, the user B and the user C as the files which are frequently accessed by the users. The file names in the access frequency database 250 are written on the basis of the statistics of actual file accesses by a system administrator or the individual users.

Each of the clients 100 is furnished with a disk storage of comparatively small capacity 150 (a corresponding one of disk storages 150-1 thru 150-n), and a terminal 160 (a corresponding one of terminals 160-1 thru 160-n). The disk storage 150 is utilized as a cache area 170 for administering the copies of some of the files 240. The client 100 includes a log-in user table 130 for storing therein the name 131 of the user who is currently logging into this client, and a cache management unit 140 for managing the caching of this client. Included in the cache management unit 140 is a cache priority control module 142 which controls cache priority levels. The user logs into the corresponding client 100 through the terminal 160 so as to access any of the files 240. In the example of FIG. 1, the user A is currently logging into the client 100-1.

The outline of the operation of this embodiment will be described below.

In a case where the user of the distributed file system has first requested a certain one of the clients 100 to access a particular one of the files 240, the pertinent client 100 loads, through the network 300, the particular file stored in the disk storage 230 of the file server 200. The cache management unit 140 operates to place the file loaded from the filer server 200, as a copy, into the cache area 170 of the disk storage 150. In a case where the same file is accessed again, the copy stored in the cache area 170 is accessed, whereby the file access can be speeded up.

Since, however, the cache area 170 has the limited storage capacity, all such files to be accessed from the pertinent client 100 cannot always be cached therein. In a case where a sufficient free space cannot be reserved in the cache area 170 in the case of caching the particular file, one or more files existing in the cache area 170 must be expelled from this cache area 170 back to the file server 200 during the caching operation.

The cache priority control module 142 of the cache management unit 140 sets the priority levels for the respective files held in the cache area 170. The cache management unit 140 selects the files to-be-expelled in the order of ascending priority levels. Concretely, the cache priority control module 142 recognizes the files which are frequently accessed by the logging-in user, by referring to the access frequency database 250 as well as the log-in user table 130 in which the name 131 of the logging-in user is entered. Subsequently, the module 142 sets high priority levels for the copies of the recognized files. Regarding the client 100-1, the user A is currently logging thereinto. Therefore, the high priority levels are set for the files F1 and F3 in correspondence with the user A on the basis of the contents of the access frequency database 250.

Now, the operation of this embodiment will be described in detail with reference to FIGS. 2 thru 8, FIG. 17 and FIG. 18.

Figure 2:
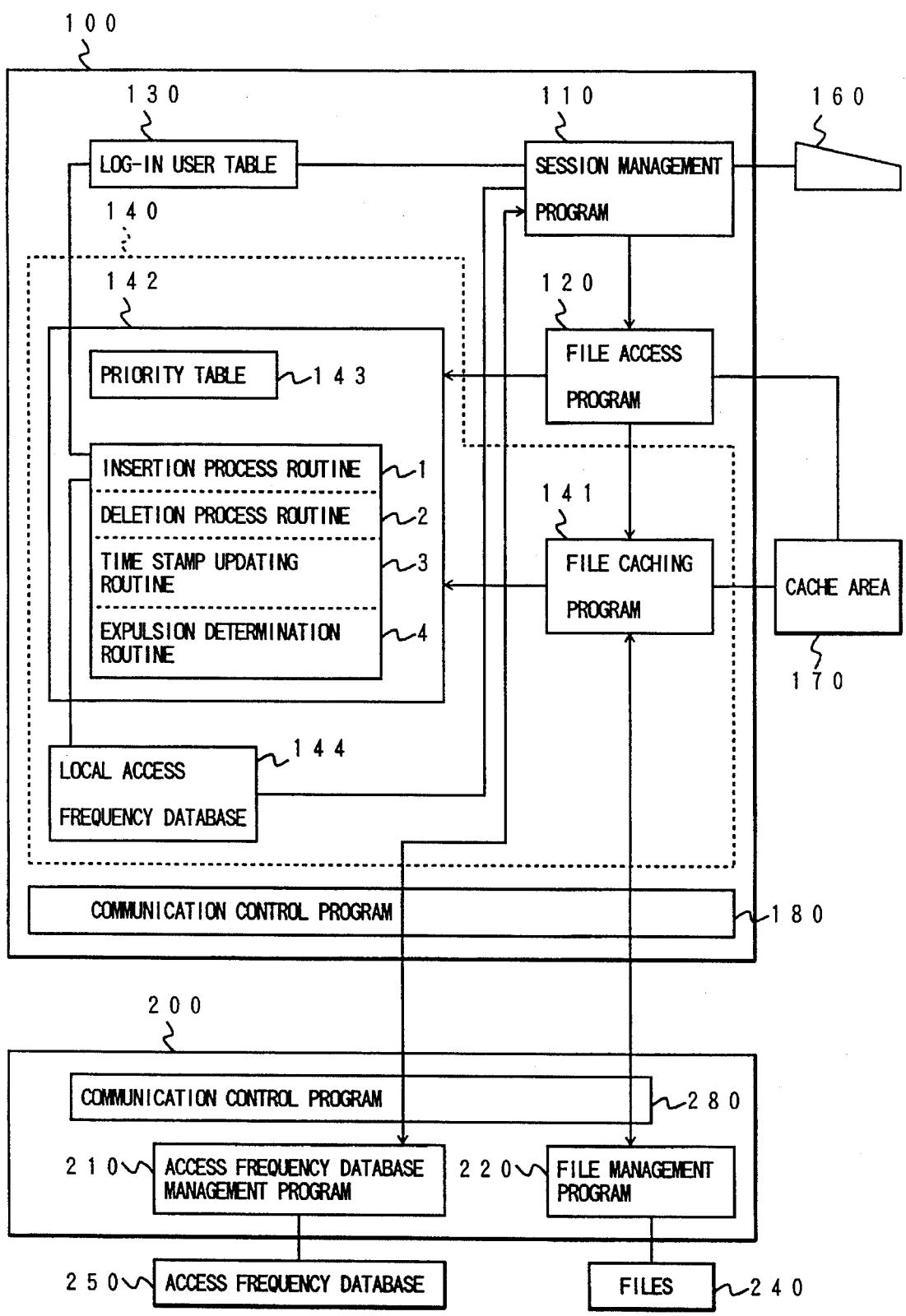
FIG. 2 is a block diagram showing the software architecture of the first embodiment.

FIG. 2 illustrates the software architecture of this embodiment. The client 100 includes a session management program 110, a file access program 120, a log-in user table 130, a file caching program 141, a cache priority control module 142, a local access frequency database 144, and a communication control program 180.

The file server 200 includes an access frequency database management program 210 for managing the access frequency database 250, a file management program 220 for managing the files 240, and a communication control program 280.

The communication control programs 180 and 280 cooperate with each other to implement network communication at the transport layer level of an OSI (open systems interconnection) model.

As shown in FIG. 17, the local access frequency database 144 is a database for entering therein only those items of the stored contents of the access frequency database 250 which concern the logged-in user, and it is configured of a user name field 1001 and a file-name list field 1002. A plurality of entries are prepared in the illustrated database 144 by taking into consideration a case where a plurality of users simultaneously log into one client, as will be stated later.

Referring back to FIG. 2, the cache priority control module 142 is configured of a priority table 143, and an insertion process routine 1, a deletion process routine 2, a time stamp updating routine 3 and an expulsion determination routine 4, each of which controls the priority table 143.

Figure 3:
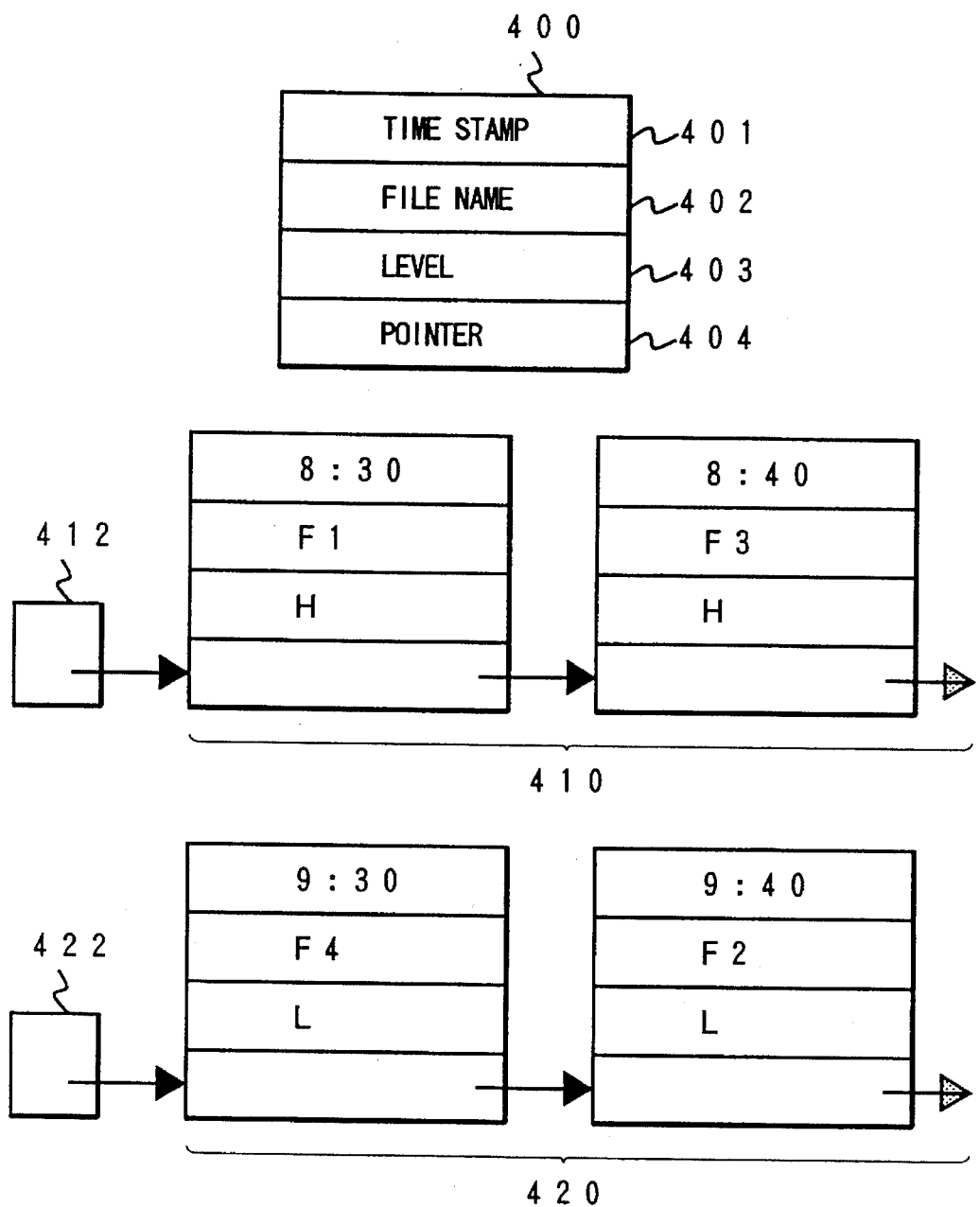
FIG. 3 is an explanatory diagram showing the setup of a priority table (143) which is included in the first embodiment.
Figure 4:
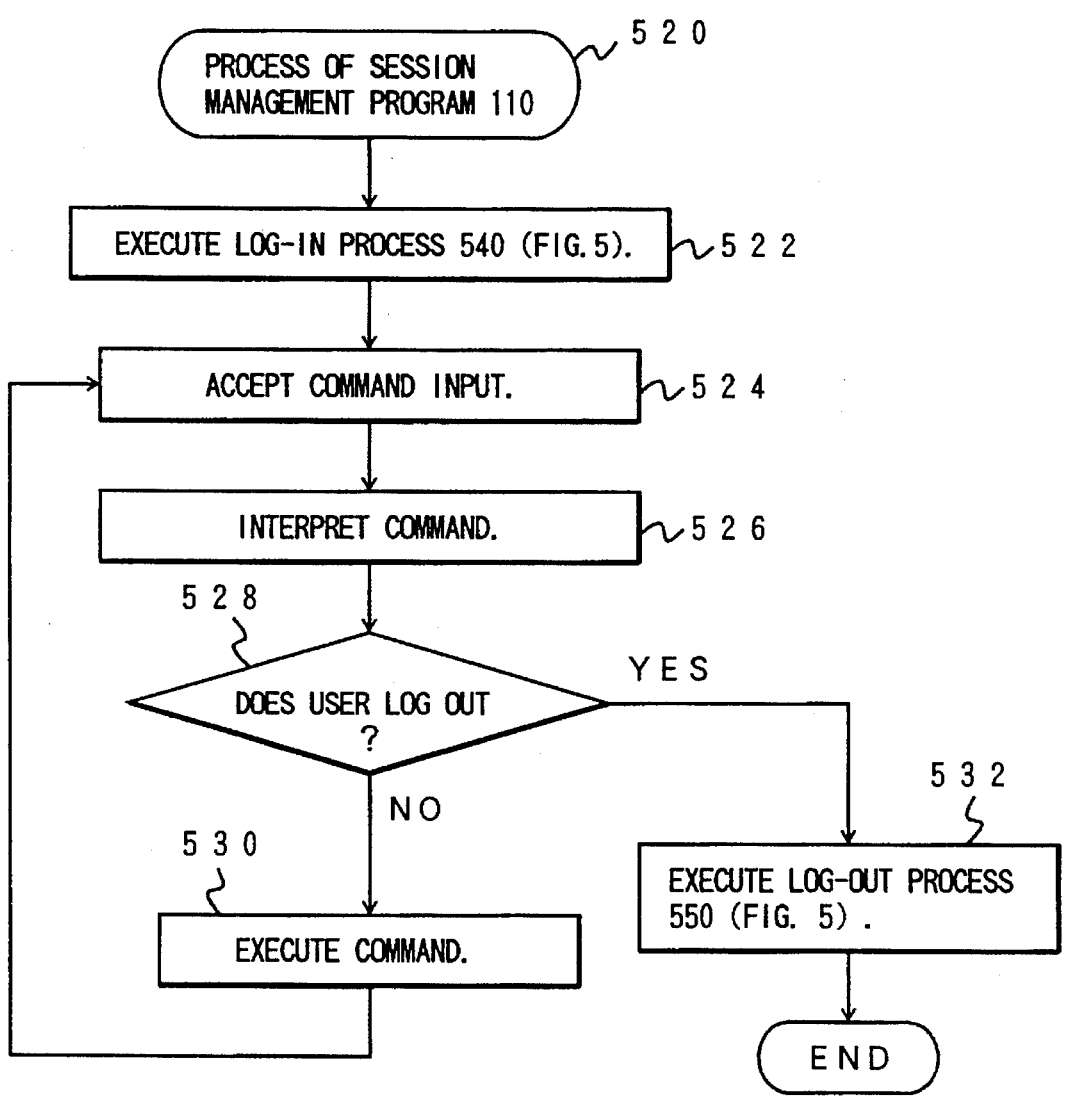
FIG. 4 is a flow chart showing the process (520) of a session management program (110) which is included in the first embodiment.

The setup of the priority table 143 is illustrated in FIG. 3. This priority table 143 is configured of a high-priority header 412, a low-priority header 422, and priority structures 400 which are created for the respective files stored in the cache area 170. One priority structure 400 is assigned to each file. The priority structure 400 is configured of a time stamp field 401, a file name field 402, a level field 403 and a pointer field 404. The time stamp field 401 records the time at which the file of a file name in the field 402 was last accessed. Here in the illustrated example, the level field 403 records either of symbol "H" indicating of a high priority level or symbol "L" indicating of a low priority level.

The priority structure 400 having the level "H" in the level field 403 is concatenated to a high-priority list 410 headed by the high-priority header 412. On the other hand, the priority structure 400 having the level "L" in the level field 403 is concatenated to a low-priority list 420 headed by the low-priority header 422. The priority structures 400 in each of the lists 410 and 420 are aligned in order according to the age of the time stamp fields 401. The files to be expelled from the cache area 170 are successively selected from the ones whose priority structures 400 are concatenated to the low-priority header 422.

The operations of the individual programs will be explained in conjunction with flow charts below.

The session management program 110 interprets and executes a command which has been input by any user. The process 520 of the session management program 110 proceeds as illustrated in the flow chart of FIG. 4.

First, a log-in process 540 is executed at a step 522. Subsequently, the command input is accepted at a step 524, and the input command is interpreted at a step 526. In a case where the log-out of the user has been decided at a step 528, a log-out process 550 is executed at a step 532, and the process 520 is ended. On the other hand, in any case other than the log-out, the input command is executed at a step 530, and the flow of the process 520 is returned to the step 524.

Figure 5:
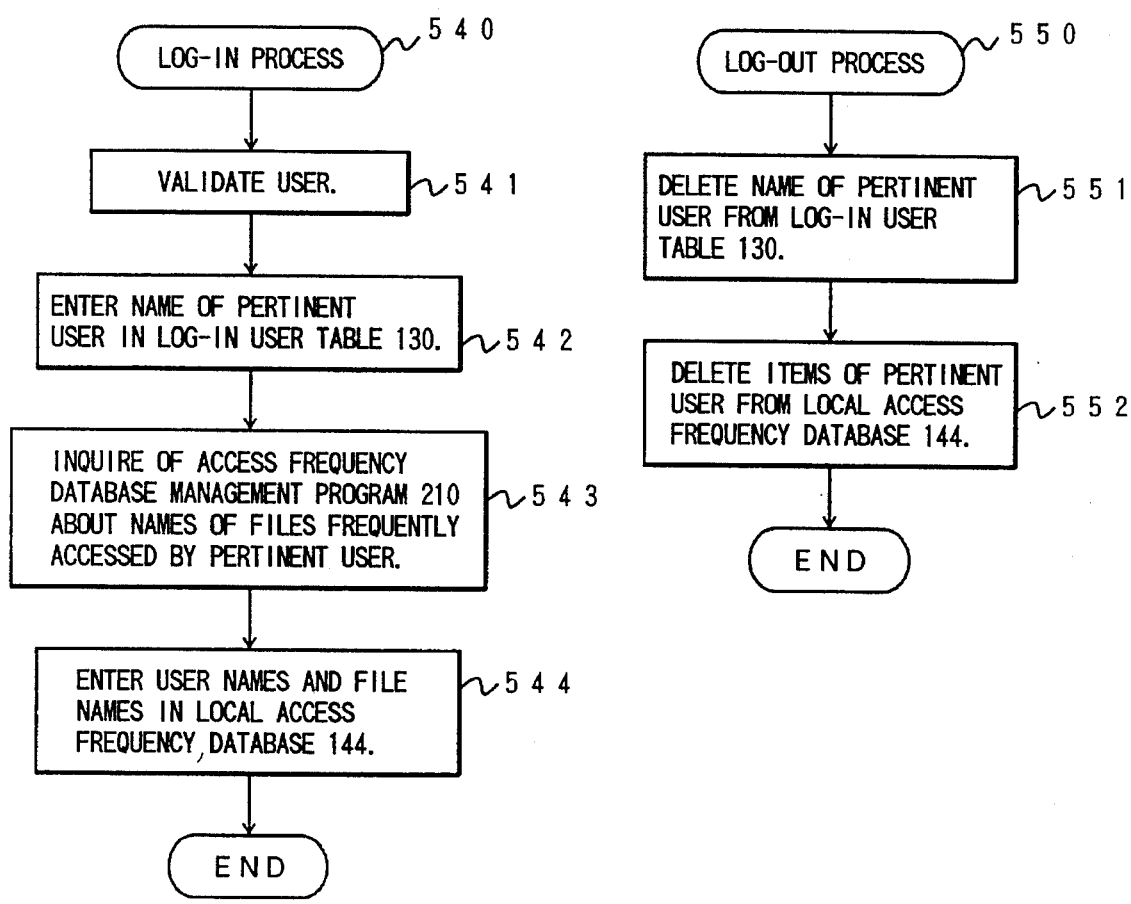
FIG. 5 is a flow chart showing a log-in process (540) and a log-out process (550) which are executed in the first embodiment.

The log-in process 540 (at the step 522 in FIG. 4) and the log-out process 550 (at the step 532 in FIG. 4) proceed as illustrated in the flow chart of FIG. 5.

In the log-in process 540, the user is validated at a step 541, and the name of the user is entered in the log-in user table 130 at a step 542. At the next step 543, the session management program 110 interfaces with the access frequency database management program 210 of the file server 200, to obtain the names of the files which are frequently accessed by the user. The user name and the file names are entered in the local access frequency database 144 at a step 544. Then, the log-in process 540 is ended.

In the log-out process 550, the name of the user is deleted from the log-in user table 130 at a step 551, and the items of the user are deleted from the local access frequency database 144 at a step 552. Then, the log-out process 550 is ended.

In this manner, the name of the user who is currently logging in can be entered in and deleted from the log-in user table 130 by the log-in process 540 and the log-out process 550, respectively. Further, the names of the files which are frequently accessed by the logging-in user can be entered in and deleted from the local access frequency database 144 in correspondence with the name of the user.

Some of the commands to be executed at the step 530 (in FIG. 4) execute the file access program 120 in order to access the files 240 of the file server 200. The process 560 of the file access program 120 proceeds as illustrated in the flow chart of FIG. 6.

First, whether or not the pertinent file to be accessed exists in the cache area 170 is checked at a step 562. Subject to the existence of the pertinent file in the cache area 170, the step 562 is followed by a step 566. In contrast, if the pertinent file does not exist in the cache area 170, the step 562 is followed by a step 564, at which the file caching program 141 is executed to cache the pertinent file.

Subsequently, the copy of the pertinent file held in the cache area 170 is accessed at the step 566, and the time stamp updating routine 3 is executed at a step 568. Then, the process 560 is ended. In the time stamp updating routine 3, the current time is recorded in the time stamp field 401 of the priority structure 400 corresponding to the accessed file, and the order of the priority structure 400 of the file within the list 410 or 420 is altered.

Figure 6:
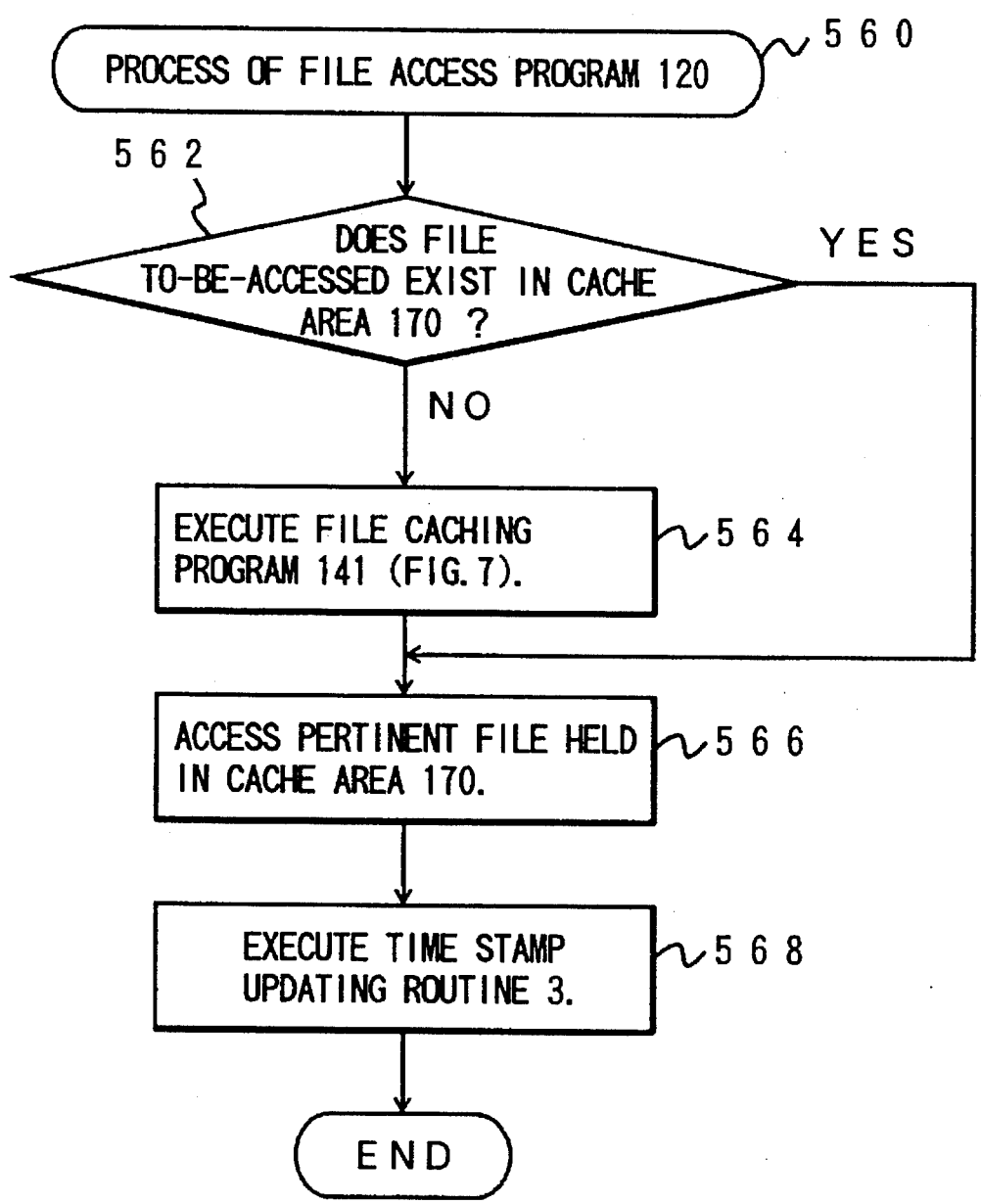
FIG. 6 is a flow chart showing the process (560) of a file access program (120) which is included in the first embodiment.
Figure 7:
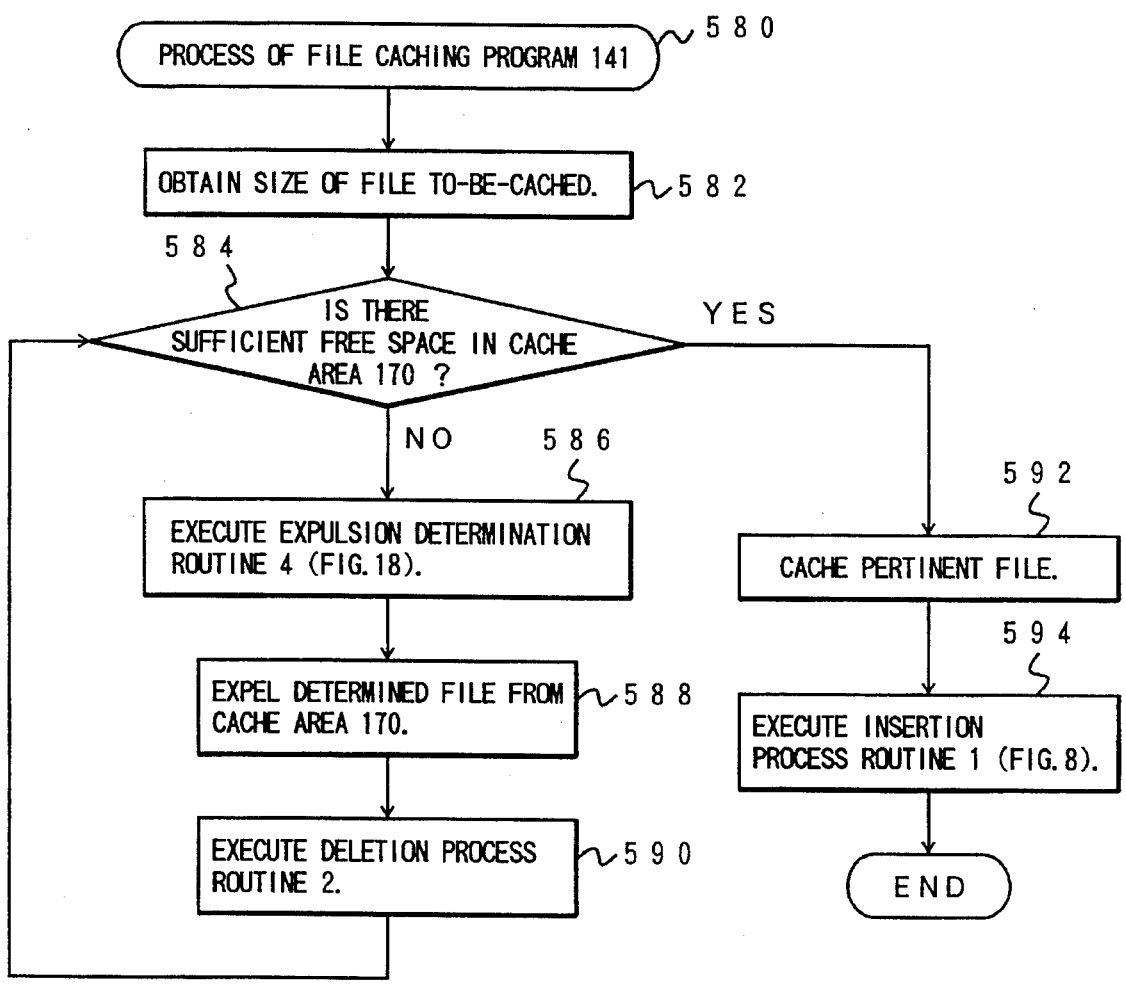
FIG. 7 is a flow chart showing the process (580) of a file caching program (141) which is included in the first embodiment.

The process 580 of the file caching program 141 corresponding to the step 564 in FIG. 6 proceeds as illustrated in the flow chart of FIG. 7.

First, the file caching program 141 interfaces with the file management program 220 of the file server 200 to obtain the size of the pertinent file to-be-cached, at a step 582. Subsequently, whether or not a free space sufficient to cache the pertinent file exists in the cache area 170, is checked at a step 584. If sufficient free space exist, the step 584 is followed by a step 592.

If sufficient free space for the caching does not exist, the step 584 is followed by a step 586, at which the expulsion determination routine 4 is executed in order that a particular one of the cached files to be expelled from the cache area 170 may be determined. Further, at a step 588, the particular file is expelled from the cache area 170. Besides, at a step 590, the deletion process routine 2 is executed to delete the priority structure 400 which corresponds to the expelled particular file. Thereafter, the flow of the process 580 is returned to the step 584.

At the step 592, the file caching program 141 requests the file management program 220 of the file server 200 to transfer the pertinent file to-be-cached, and it places the pertinent file in the cache area 170. At the last step 594, the insertion process routine 1 is executed to enter the pertinent file in the priority table 143. Then, the process 580 is ended.

Finally, the insertion process routine 1 and the expulsion determination routine 4 will be explained.

Figure 8:
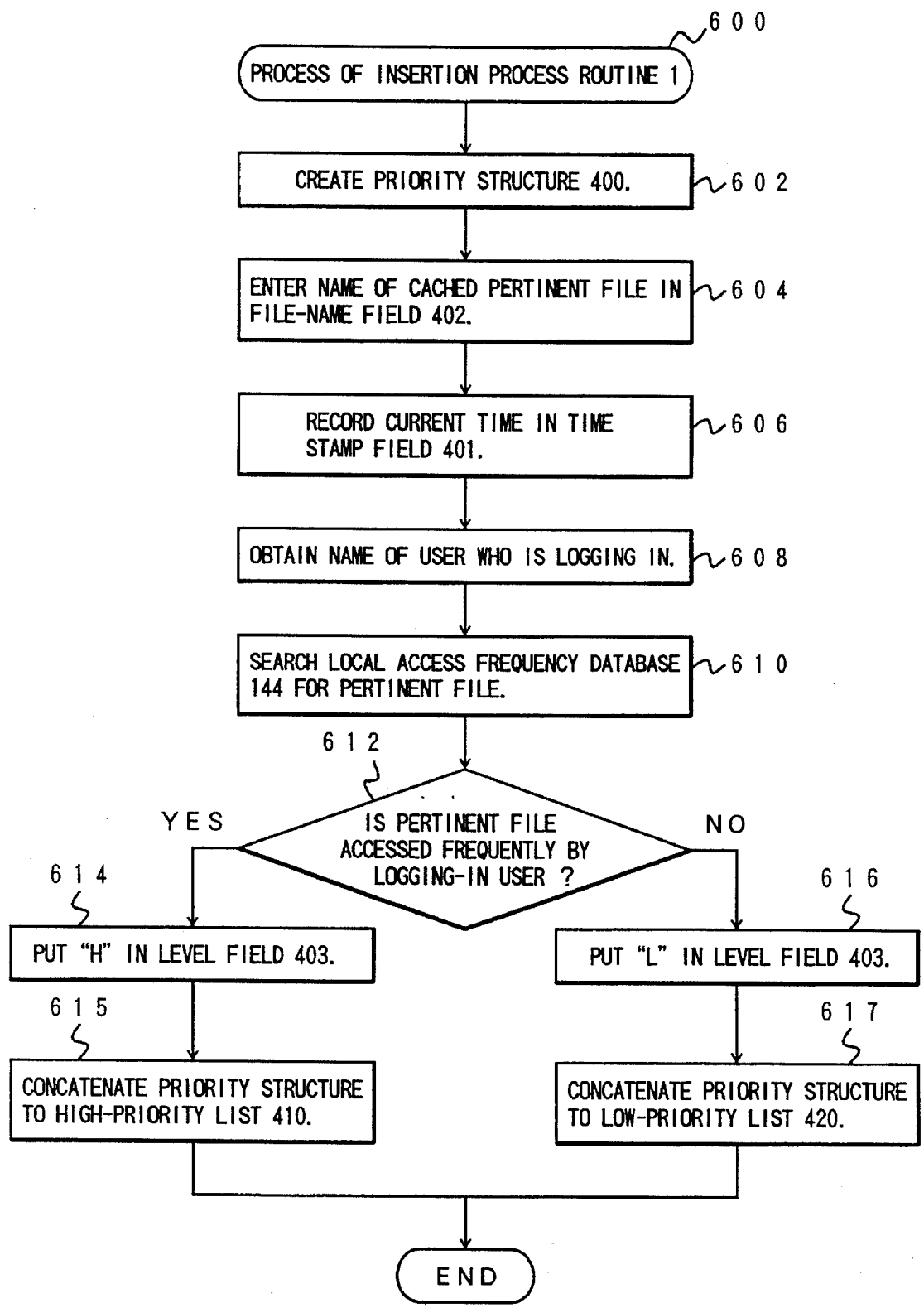
FIG. 8 is a flow chart showing the process (600) of an insertion process routine (1) which is included in the first embodiment.

A process 600 in FIG. 8 corresponds to the processing contents of the insertion process routine 1. The priority structure 400 is created at a step 602. The name of the cached pertinent file is entered in the file name field 402 at a step 604, and the current time is recorded in the time stamp field 401 at a step 606. The name of the user who is currently logging in is obtained by reference to the log-in user table 130 at a step 608, and the local access frequency database 144 is searched for the user name at a step 610.

Whether or not the pertinent file is frequently accessed by the logged-in user is judged at a step 612. On condition that the pertinent file is frequently accessed, the symbol "H" is put in the level field 403 at a step 614, and the resulting priority structure 400 is concatenated to the high-priority list 410 at a step 615. In contrast, if the pertinent file is not frequently accessed, the symbol "L" is put in the level field 403 at a step 616, and the resulting priority structure 400 is concatenated to the low-priority list 420 at a step 617. In, for example, the client 100-1, the files F1 and F3 are concatenated to the high-priority list 410, and any other file is concatenated to the low-priority list 420. The process 600 ends with the concatenation of the priority structure 400 at the step 615 or 617.

FIG. 18 illustrates the process 1100 of the expulsion determination routine 4 corresponding to the step 586 in FIG. 7. In the expulsion determination routine 4, whether or not the low-priority list 420 of the priority table 143 is empty is first checked at a step 1102. When the low-priority list 420 is empty, the priority structure 400 lying at the head of the high-priority list 410 is selected at a step 1104. On the other hand, when the low-priority list 420 is not empty, the step 1102 is followed by a step 1106, at which the priority structure 400 lying at the head of the low-priority list 420 is selected. The process 1100 ends with the selection of the priority structure 400 at the step 1104 or 1106.

Since, in this embodiment, the file to be frequently accessed by the logged-in user is concatenated to the high-priority list 410, it can be kept or left in the cache area 170 at a probability higher than that of any other file. By way of example, even in a case where the user A has accessed a large number of files in bursting fashion, the files F1 and F3 can be kept in the cache area 170 without fail. Consequently, the hit ratio of caching can be enhanced to speed up the file access.

In an environment assumed by this embodiment, the user A does not always log into the client 100-1. They can log into any one of the n clients 100 which is not currently being used by anybody. It is accordingly effective for the access frequency database 250 to be administered by the file server 200 and shared among the n clients 100.

In this embodiment, each file is cached as a whole. It is also possible, however, to construct an embodiment in which each file is divided into fixed-length blocks so as to cache the file in block units. In this case, the priority structure 400 is created for every block. The name of the file to which the block belongs is set in the file name field 402, and the value of the level field 403 is determined in accordance with the file name in the field 402. Thus, effects similar to those of the first embodiment can be achieved.

In this embodiment, a single terminal 160 is connected to each client 100, and only one user can log into the client 100 at any one time. However, when a plurality of terminals are connected to each client 100 or when a remote log-in function is supported, a plurality of users are also permitted to log into the client 100 at the same time. The software explained in conjunction with FIG. 2, et seq. is also applicable to such an environment in which the plurality of users log into the identical client simultaneously.

Now, the second embodiment of the present invention will be described. In the first embodiment, any file has its priority level determined when it is cached. The second embodiment consists in that the priority levels of the individual files held in the cache area 170 are re-evaluated when the user logs in and logs out.

Figure 9:
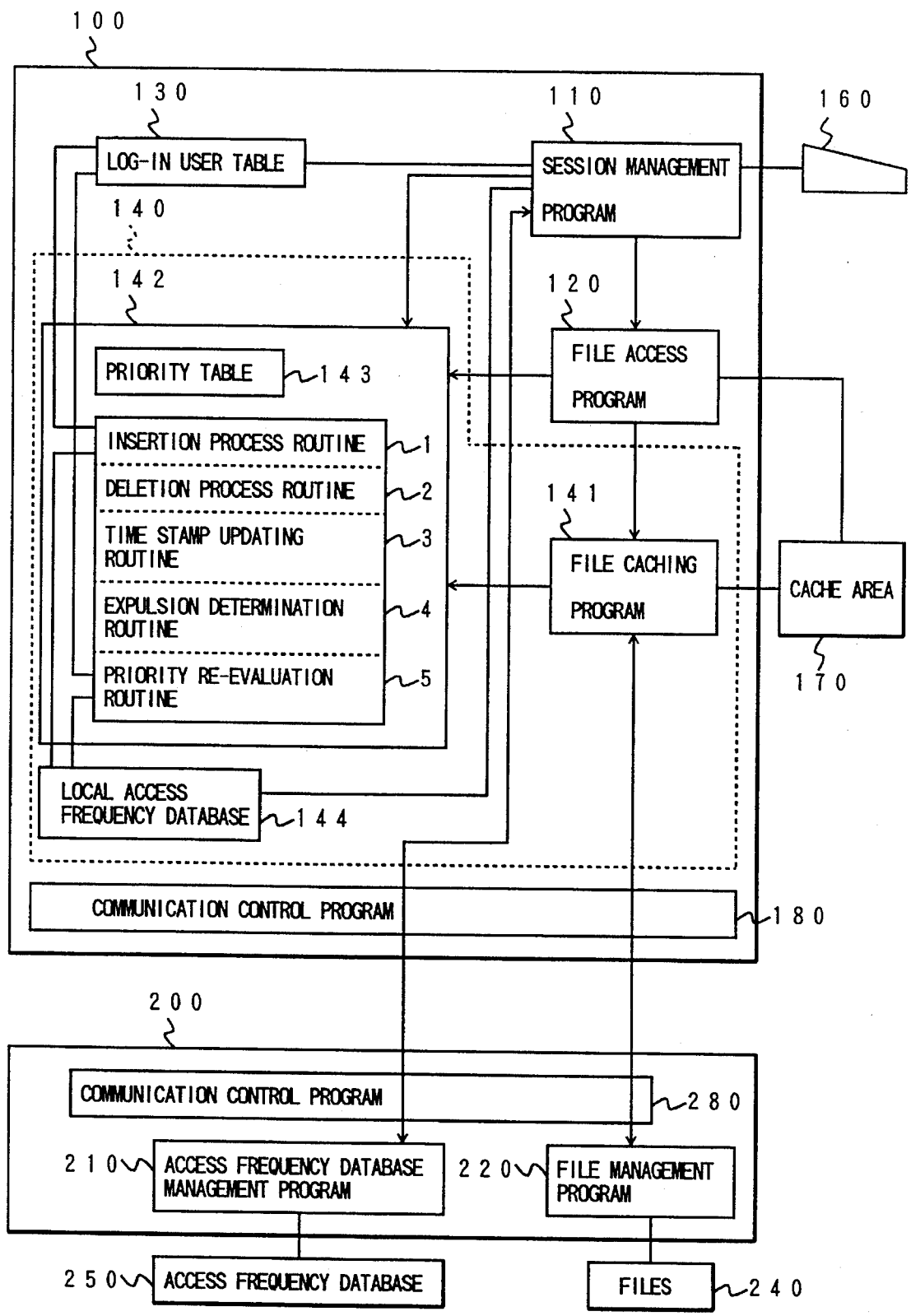
FIG. 9 is a block diagram showing the software architecture of the second embodiment.

FIG. 9 illustrates the software architecture of the second embodiment. In this embodiment, a priority re-evaluation routine 5 is added to the cache priority control module 142. Each of a log-in process 540 and a log-out process 550 executes the priority re-evaluation routine 5.

Figure 10:
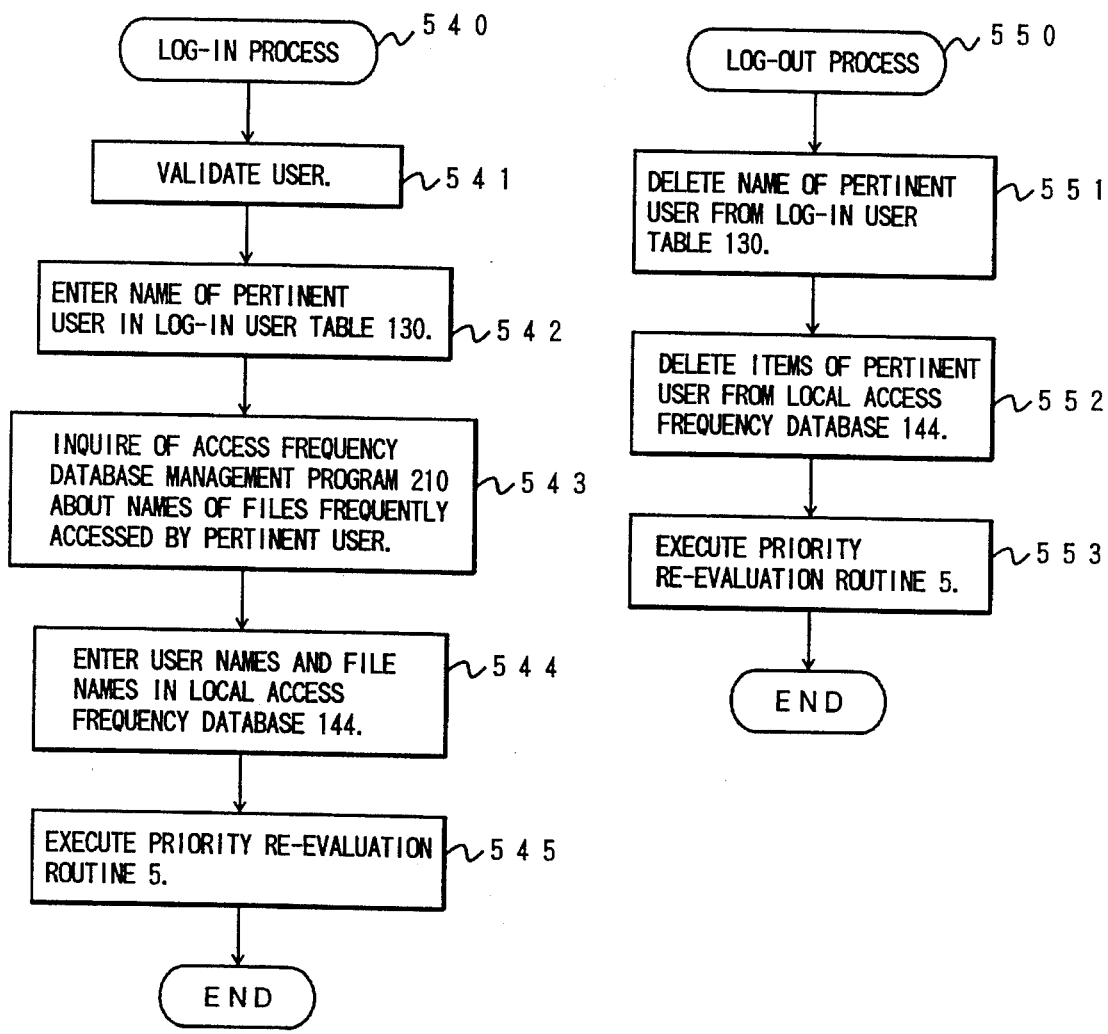
FIG. 10 is a flow chart showing a log-in process (540) and a log-out process (550) which are executed in the second embodiment.

FIG. 10 illustrates the log-in process 540 and the log-out process 550 in this embodiment. In each of these processes, the priority re-evaluation routine 5 is executed after the contents of the log-in user table 130 and the local access frequency database 144 have been altered (a step 545 in the process 540, or a step 553 in the process 550).

Figure 19:
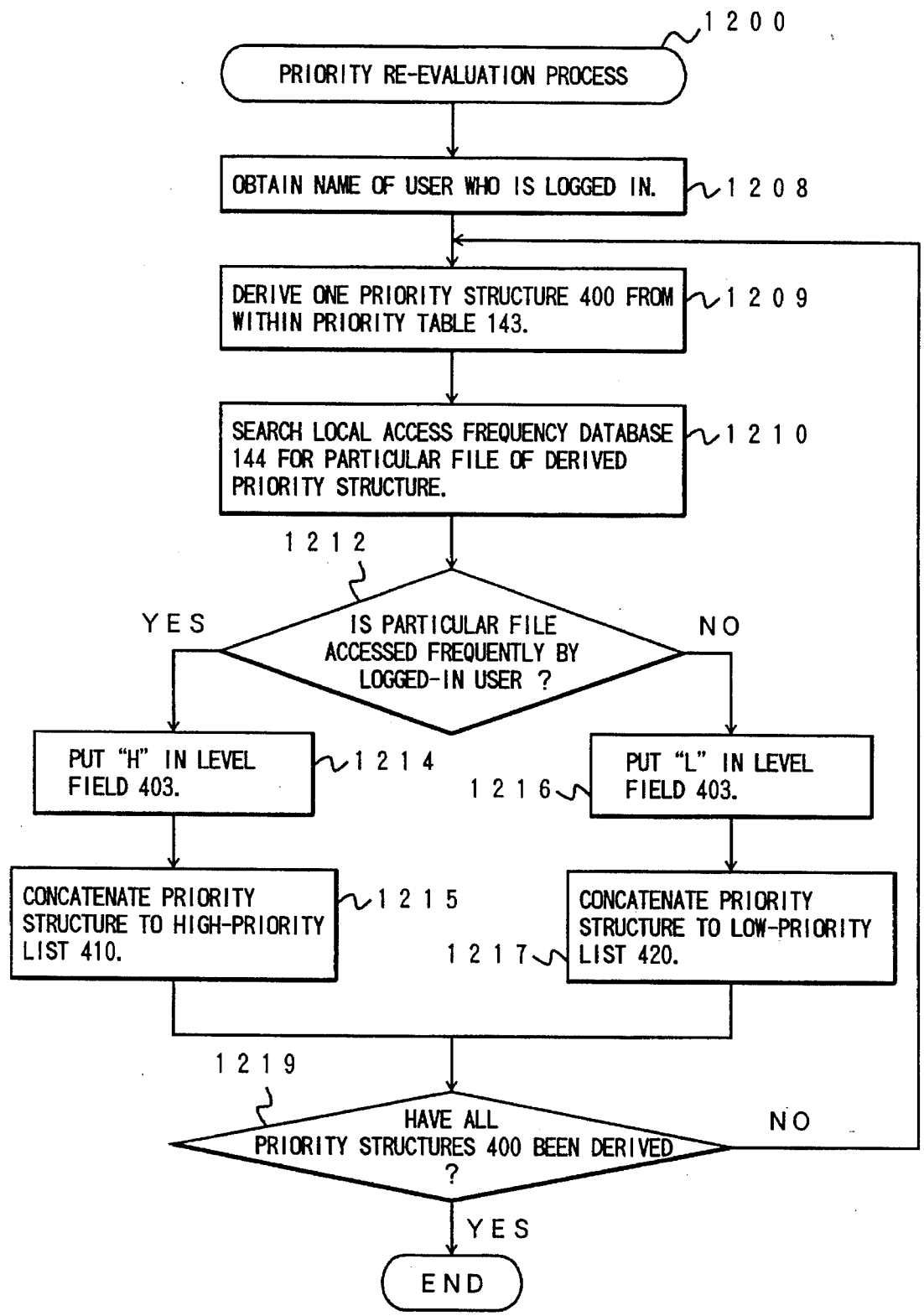
FIG. 19 is a flow chart showing the process (1200) of a priority re-evaluation routine (5) which is included in the second embodiment.

The priority re-evaluation routine 5 re-evaluates the values of the level fields 403 for all the priority structures 400 contained in the priority table 143, and concatenates the priority structures 400 in accordance with the results. FIG. 19 illustrates the practicable process 1200 of the priority re-evaluation routine 5. First, it is checked whether or not a logged in user is present (step 1208). In a case where any logged-in user does not exist because of his/her log-out, the nonexistence of any user is recognized. Subsequently, one priority structure 400 is derived from within the priority table 143 (step 1209). The local access frequency database 144 is searched for the particular file of the derived priority structure 400 on the basis of the name of the logged-in user (step 1210). Whether or not the particular file of the structure 400 derived at the step 1209 is frequently accessed by the logged-in user, is checked (step 1212). On condition that the particular file is frequently accessed by the user, the symbol "H" is put in the level field 403 of the priority structure 400 (step 1214), and the resulting structure 400 is concatenated to the predetermined position of the high-priority list 410 (step 1215). In contrast, if the particular file is not frequently accessed by the user, the symbol "L" is put in the level field 403 of the priority structure 400 (step 1216), and the resulting structure 400 is concatenated to the predetermined position of the low-priority list 420 (step 1217). The above processing is iterated for all the priority structures 400 contained in the priority table 143 (step 1219). When all the priority structures 400 have been derived and handled, the process 1200 is ended. Thus, in the case where the user is logged in, the priority table 143 is set up again in correspondence with the user. That is, if the file which is frequently accessed by the user is concatenated to the low-priority list 420 on that occasion, it is newly concatenated to the high-priority list 410. Conversely, in a case where a certain user has logged out, the priority structure 400 of the file to be frequently accessed by the certain user that is concatenated to the high-priority list 410, is newly concatenated to the low-priority list 420. However, in a case where another user remains logged in, the file to be frequently accessed by the user remains concatenated to the high-priority list 410.

Figure 11:
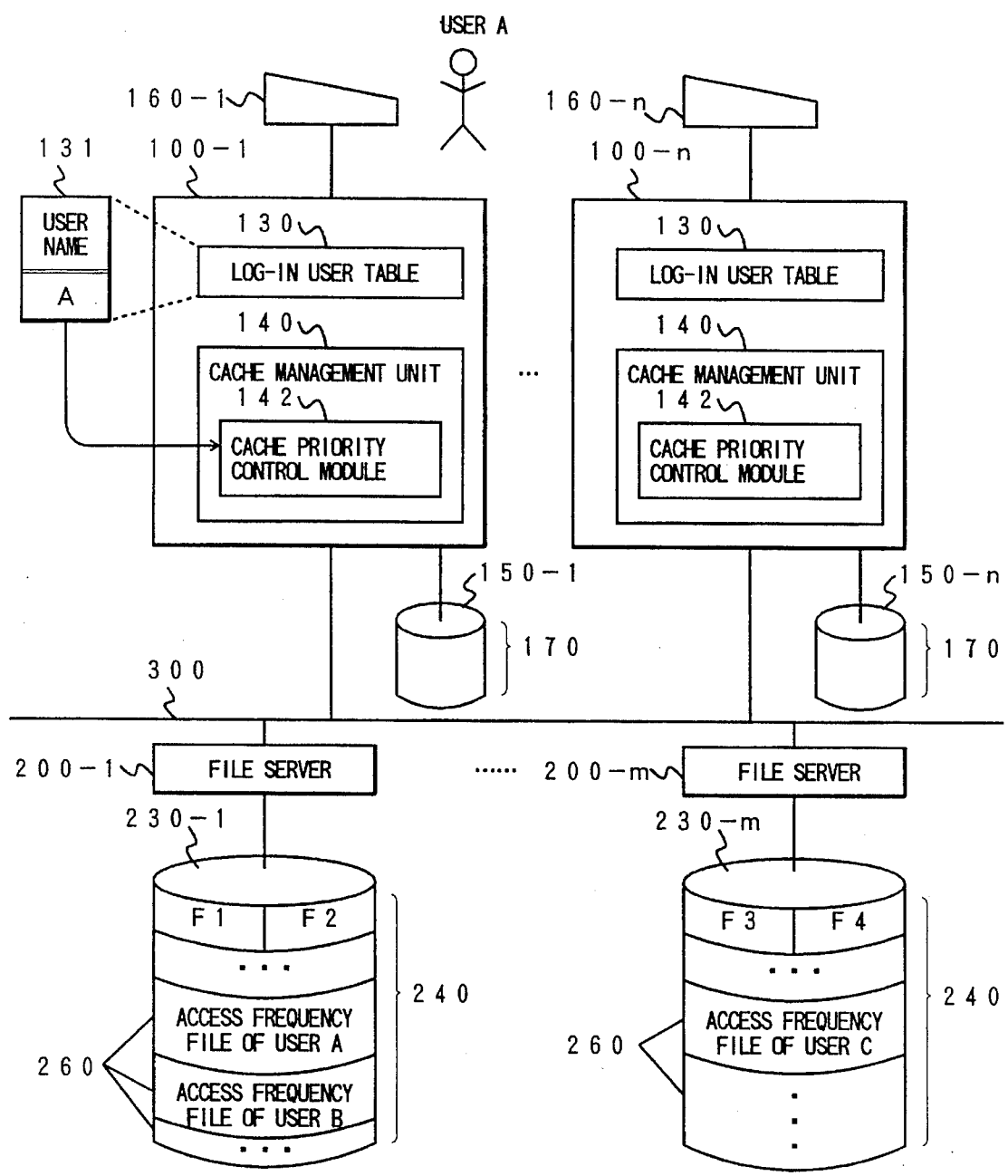
FIG. 11 is a block diagram showing the system architecture of the third embodiment.

Now, FIG. 11 illustrates the system architecture of a distributed file system according to the third embodiment of the present invention.

In this embodiment, access frequency files 260 are prepared for respective users. Each of the access frequency files 260 records the names of files which are frequently accessed by the corresponding user. Each user can set the contents of the access frequency file 260 of their own at will.

The user designates the name of their access frequency file 260 at the step of validating the user (the step 541 in FIG. 5 or FIG. 10). In the log-in process 540, the file names contained in the access frequency file 260 designated by the user are entered in the local access frequency database 144.

The access frequency files 260 of the respective users are distributed among m file servers 200 (200-1 thru 200-m). The file servers 200-1 thru 200-m are respectively furnished with disk storages 230-1 thru 230-m. This embodiment is effective to enhance the reliability of the distributed file system and to distribute the load thereof.

FIG. 12 illustrates the system architecture of a distributed file system according to the fourth embodiment of the present invention.

File servers 200 in this embodiment administer the data partitions 241 of respective files 240 in association with the names of users who access the files frequently (in association with user-name list partitions 242).

Figure 13:
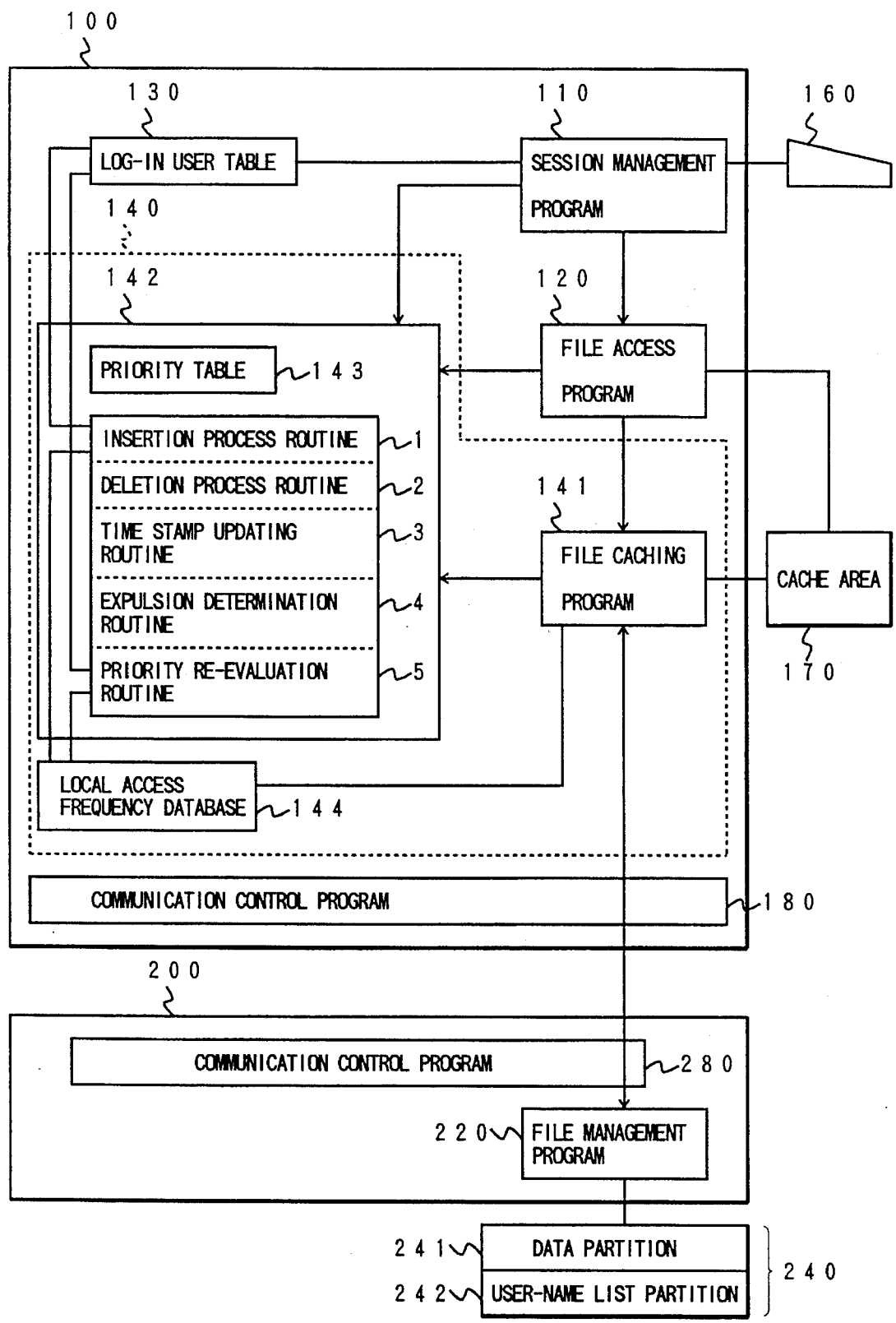
FIG. 13 is a block diagram showing the software architecture of the fourth embodiment.

FIG. 13 illustrates the software architecture of this embodiment.

As shown in FIG. 14, a local access frequency database 144 in this embodiment is configured of a file name field 253 and a user-name list field 254. Regarding each of the files held in a cache area 170, the name of the file and the user-name list thereof are entered in association.

FIG. 15 illustrates a log-in process 540 and a log-out process 550 in this embodiment. Here in this embodiment, the name of the user who uses the particular file at a high frequency is known with the name of the particular file as a key. Therefore, when compared with the processes shown in FIG. 5 the processes shown in FIG. 15 dispense with the steps 543, 544 and 552 mentioned in FIG. 5.

Figure 16:
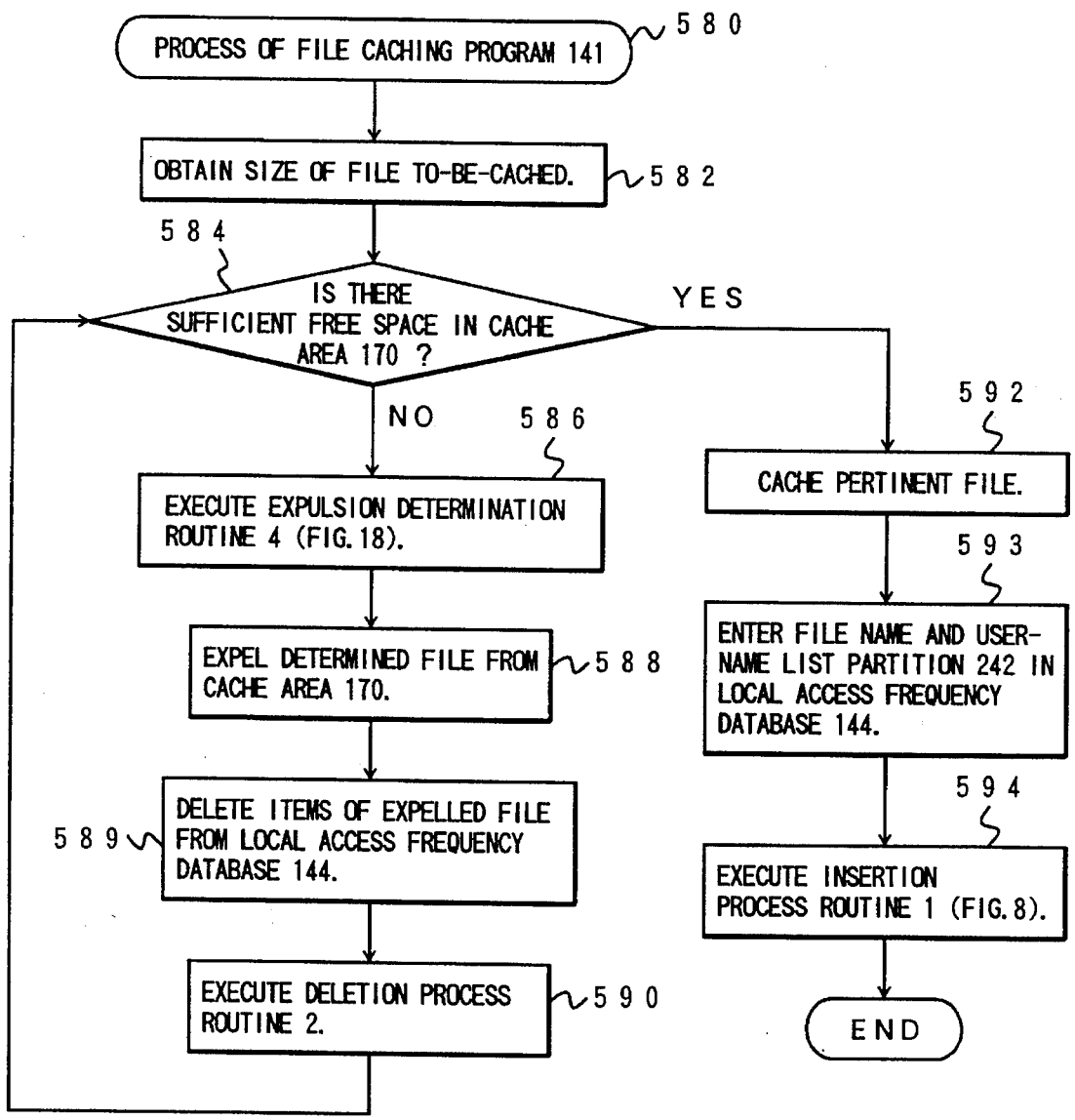
FIG. 16 is a flow chart showing the process (580) of a file caching program (141) which is included in the fourth embodiment.

FIG. 16 illustrates the process 580 of a file caching program 141 in this embodiment. After the pertinent file has been cached at the step 592 (in FIG. 7), the file name and the user-name list partition 242 are entered in the local access frequency database 144 (a step 593). After the particular file has been expelled from the cache area 170 at the step 588 (in FIG. 7), the items of the expelled file are deleted from the local access frequency database 144 (a step 589).

In the third embodiment described before, when the file server 200 for administering the access frequency files 260 has broken down, the priority levels of the files cannot be determined. In this regard, the fourth embodiment has the advantage that, since the respective files contain the access frequency information, the priority levels thereof can be determined without fail.

While the preferred embodiments of the present invention have been described above, various modifications and alterations can be made without departing from the purport of the present invention. By way of example, the foregoing embodiments are so constructed and operated that, when the file to be accessed does not exist in the cache area in the file access mode, it is cached (i.e., it is copied from the file server into the cache area of the client). Alternatively, when the user is logging in, the files that they frequently access may well be searched for, by referring to the access frequency database, and then cached.

As described above, according to the present invention, a cache priority control module can specify files which are frequently accessed by a logged-in user, by referring to a log-in user table and an access frequency database. The files to be frequently accessed by the logged-in user are set at high priority levels, whereby they can be kept in a cache area at higher probabilities. As a result, the hit ratio of caching can be enhanced to speed up file accesses for every user who logs into a client.

What is claimed is:

1. In a distributed file system wherein a file server for administering a plurality of files, and clients for accessing the files administered by the file server are connected through a network; and each of the clients has a cache memory for administering copies of the files, and a priority table for storing therein priority levels which function as criteria for judging, when a copy of one of the files is to be expelled, if the copies of the files placed in the cache memory of the pertinent client through accesses from the pertinent client to the file server are to be kept in the cache memory;

a method of controlling a cache memory for files, comprising the steps of:

prestoring names of users and names of those ones of said files which are frequently accessed by the users, as an access frequency database in said file server, the user names and the file names being associated for the respective users who log into any of said clients, in the access frequency database;

recognizing the user name of a certain one of said users, in one client when the certain user is logging into said one client;

checking if a particular one of said files having a certain one of said file names is the file which is frequently accessed by the recognized user, in said one client and on the basis of the contents of said access frequency database when said recognized user has loaded the copy of the particular file from said file server into said cache memory;

setting the priority level of said particular file in accordance with the checked result so that the priority levels of the files of high access frequencies may become high, and then storing the set priority level in said priority table; and determining the file whose priority level is low for the user currently operating said one client, as the file to-be-expelled on the basis of the contents of said priority table when said copy of one of said files is to be expelled from said cache memory of said one client.

2. A method of controlling a cache memory for files as defined in claim 1, wherein in said priority table, the file whose access frequency has been checked to be high for the logged-in user on the basis of said contents of said access frequency database is concatenated to a high-priority list, and any other file is concatenated to a low-priority list.

3. A method of controlling a cache memory for files as defined in claim 2, wherein when said copy of said particular file has been loaded into said cache memory and when it has been accessed, times on these occasions are respectively recorded in association with said particular file in said priority table, and said priority levels of said files are updated on the basis of the recorded times so as to become higher in correspondence with newer ones of said recorded times, in each of said high-priority list and said low-priority list.

4. A method of controlling a cache memory for files as defined in claim 1, wherein when said user of said one client logs in and logs out, said priority levels of the respective files in said priority table are updated for the copies of said files already existent in said cache memory and on the basis of the access frequencies of said user for the respective copies.

5. A method of controlling a cache memory for files as defined in claim 2, wherein at the times when said user of said one client logs in and logs out, said priority levels of the respective files in said priority table are updated for the copies of said files already existent in said cache memory and on the basis of the access frequencies of said user for the respective copies.

6. A method of controlling a cache memory for files as defined in claim 1, wherein when said cache memory stores therein the copies of fixed-length block units obtained by dividing each of said files into a plurality of fixed-length blocks, said priority table stores the priority levels in said fixed-length block units therein.

7. A method of controlling a cache memory for files as defined in claim 1, wherein when the copy of a certain one of said files is not existent in said cache memory at an access to the certain file in said one client, said copy of said certain file is loaded from said file server into said cache memory.

8. A method of controlling a cache memory for files as defined in claim 1, wherein when said certain user has logging into said one client, the files whose access frequencies are high for said certain user are found on the basis of said access frequency database, and the copies of said files of the high access frequencies are loaded from said file server into said cache memory without regard to the presence of accesses to said files.

9. In a distributed file system wherein a file server for administering a plurality of files, and clients for accessing the files administered by the file server are connected through a network; and each of the clients has a cache memory for administering copies of the files;

a method of controlling a cache memory for files, comprising the steps of:

prestoring names of users and names of those ones of said files which are frequently accessed by the users, as an access frequency database in said file server, the user names and the file names being associated for the respective users who log into any of said clients, in the access frequency database;

recognizing the user name of a certain one of said users, in one client when the certain user is logging into said one client;

checking if a particular one of said files having a certain one of said file names is the file which is frequently accessed by the recognized user, in said one client and on the basis of the contents of said access frequency database; and thenceforth loading said copy of said particular file whose access frequency is high in accordance with the checked result, from said file server into said cache memory without regard to the presence of the access to said particular file when said user has logged into said one client.

10. In a distributed file system wherein at least one file server for administering a plurality of files, and clients for accessing the files administered by the file server are connected through a network;

a distributed file system wherein:

said file server includes an access frequency database in which names of users to log into any ones of said clients and names of the files to be frequently accessed by the respective users are prestored in association; and each of said clients includes:

a log-in user table for entering therein the name of the user who is logging in;

a cache memory for administering copies of the files stored in said file server; and cache management means for setting priority levels for the respective copies of said files stored in said cache memory, and for performing a control in which the copy of low priority level is expelled from said cache memory when a sufficient free space cannot be reserved in said cache memory in the case of loading a copy of another of said files of said file server into said cache memory;

said cache management means setting said priority levels for said respective copies of said files stored in said cache memory, on the basis of said log-in user table and said access frequency database.

11. A distributed file system as defined in claim 10, wherein said cache management means includes a local access frequency database which holds therein a copy of a content part of the first-mentioned access frequency database corresponding to the user who is logged in, and said cache management means determines said priority levels on the basis of said local access frequency database and said log-in user table.

12. A distributed file system as defined in claim 10, wherein said access frequency database stores therein an access frequency file in which the names of said files to be frequently accessed by said users are entered for said respective users.

13. A distributed file system as defined in claim 11, wherein said access frequency database stores therein an access frequency file in which the names of said files to be frequently accessed by said users are entered for said respective users.

14. A distributed file system as defined in claim 10, comprising a plurality of such file servers, each of which includes a part of said access frequency database which stores the names of said users to frequently access the corresponding files administered by the pertinent file server.

15. A distributed file system as defined in claim 11, comprising a plurality of such file servers, each of which includes a part of said access frequency database which stores the names of said users to frequently access the corresponding files administered by the pertinent file server.

16. A distributed file system as defined in claim 10, wherein said cache memory stores therein the copies of fixed-length block units obtained by dividing each of said files into a plurality of fixed-length blocks, and said cache management means includes a priority table in which the priority levels are stored in said fixed-length block units.

17. A distributed file system as defined in claim 10, wherein said cache management means includes a priority table which contains a high-priority list for concatenating thereto the file whose access frequency is set high for the logged-in user on the basis of the contents of said access frequency database, and a low-priority list for concatenating any other file thereto.

18. A distributed file system as defined in claim 17, wherein said cache management means includes means for recording respective times, when the copy of a particular one of said files has been loaded into said cache memory and when said copy has been accessed, in association with the particular file in said priority table, and for updating said priority levels of said files on the basis of the recorded times so as to become higher in correspondence with newer ones of said recorded times, in each of said high-priority list and said low-priority list.

19. A distributed file system as defined in claim 10, wherein said cache management means includes a priority table for storing said priority levels of said files therein, and means for updating said priority levels of the respective files in said priority table for the copies of said files already existent in said cache memory and on the basis of the access frequencies of said user for the respective copies, when said user logs in and logs out.

* * * * *